(12) United States Patent
So (10) Patent No.: US 7,607,406 B2
(45) Date of Patent: Oct. 27, 2009

(54) VIBRATION TOUCH BUTTON-TYPE ANIMAL TRAINING DEVICE AND METHOD OF CONTROLLING THE SAME

(76) Inventor: Ho Yun So, 8-1006 Kwangjang Apt., 28 Youido-dong, Yongdungpo-gu, Seoul 150-762 (KR)

( * ) Notice: Subject to any disclaimer, the term of this patent is extended or adjusted under 35 U.S.C. 154(b) by 160 days.

(21) Appl. No.: 12/016,744

(22) Filed: Jan. 18, 2008

(65) Prior Publication Data
US 2009/0139462 A1    Jun. 4, 2009

(30) Foreign Application Priority Data
Nov. 30, 2007    (KR) .................. 10-2007-0123483

(51) Int. Cl.
*A01K 15/02* (2006.01)
*A01K 27/00* (2006.01)
(52) U.S. Cl. ....................... 119/719; 119/720
(58) Field of Classification Search ................. 119/719, 119/712, 720; 340/573.1, 573.3; 367/93–94
See application file for complete search history.

(56) References Cited

U.S. PATENT DOCUMENTS

| | | | |
|---|---|---|---|
| 5,099,797 A | 3/1992 | Gonda | |
| 5,471,954 A | 12/1995 | Gonda et al. | |
| 5,666,908 A * | 9/1997 | So | 119/720 |
| 6,502,060 B1 * | 12/2002 | Christian | 702/178 |
| 6,721,681 B1 * | 4/2004 | Christian et al. | 702/178 |
| 6,860,240 B2 * | 3/2005 | Kim et al. | 119/719 |
| 7,271,717 B1 * | 9/2007 | Amos | 340/539.15 |
| 2003/0122698 A1 * | 7/2003 | Horie et al. | 341/176 |
| 2006/0011146 A1 * | 1/2006 | Kates | 119/719 |
| 2006/0196446 A1 * | 9/2006 | Kates | 119/719 |
| 2008/0036610 A1 * | 2/2008 | Hokuf et al. | 340/573.3 |
| 2008/0236513 A1 * | 10/2008 | Barlebo-Larsen et al. | 119/719 |

FOREIGN PATENT DOCUMENTS

| | | |
|---|---|---|
| JP | 2001117717 | 4/2001 |
| JP | 2004185415 | 7/2004 |

* cited by examiner

*Primary Examiner*—Son T Nguyen
*Assistant Examiner*—Marisa Conlon
(74) *Attorney, Agent, or Firm*—Holme Roberts & Owen LLP

(57) ABSTRACT

Disclosed herein is a vibration touch button-type animal training device including a transmitter and a receiver. The transmitter includes a constant button switch, an intermittent button switch, a pager button switch, a beep tone button switch, a transmission control unit, a wireless transmission unit, a vibration generation unit, and a shock level switch. The transmission control unit receives signals from the respective button switches, and performs control such that corresponding signals are transmitted and vibrations are generated. The vibration generation unit generates vibration in response to a control signal from the transmission control unit. The receiver includes a wireless reception unit, a GPS reception unit, an input port unit, a reception control unit, a display unit, and a shock generation unit. The display unit displays data under the control of the reception control unit and the shock generation unit generates a shock under the control of the reception control unit.

6 Claims, 9 Drawing Sheets

VIBRATION TOUCH BUTTON-TYPE ANIMAL TRAINING DEVICE AND METHOD OF CONTROLLING THE SAME

BACKGROUND OF THE INVENTION

1. Field of the Invention

The present invention relates generally to a vibration touch button-type animal training device and a method of controlling the same, and, more particularly, to a vibration touch button-type animal training device and a method of controlling the same, which cause the body of a transmitter to vibrate when the switch button of the transmitter of the animal training device is manipulated, thereby allowing a manipulator to sense the manipulation of the switch button, and which is provided with a display on the receiver thereof, thereby displaying the identification data and training data of an animal.

2. Description of the Related Art

Figure 1:
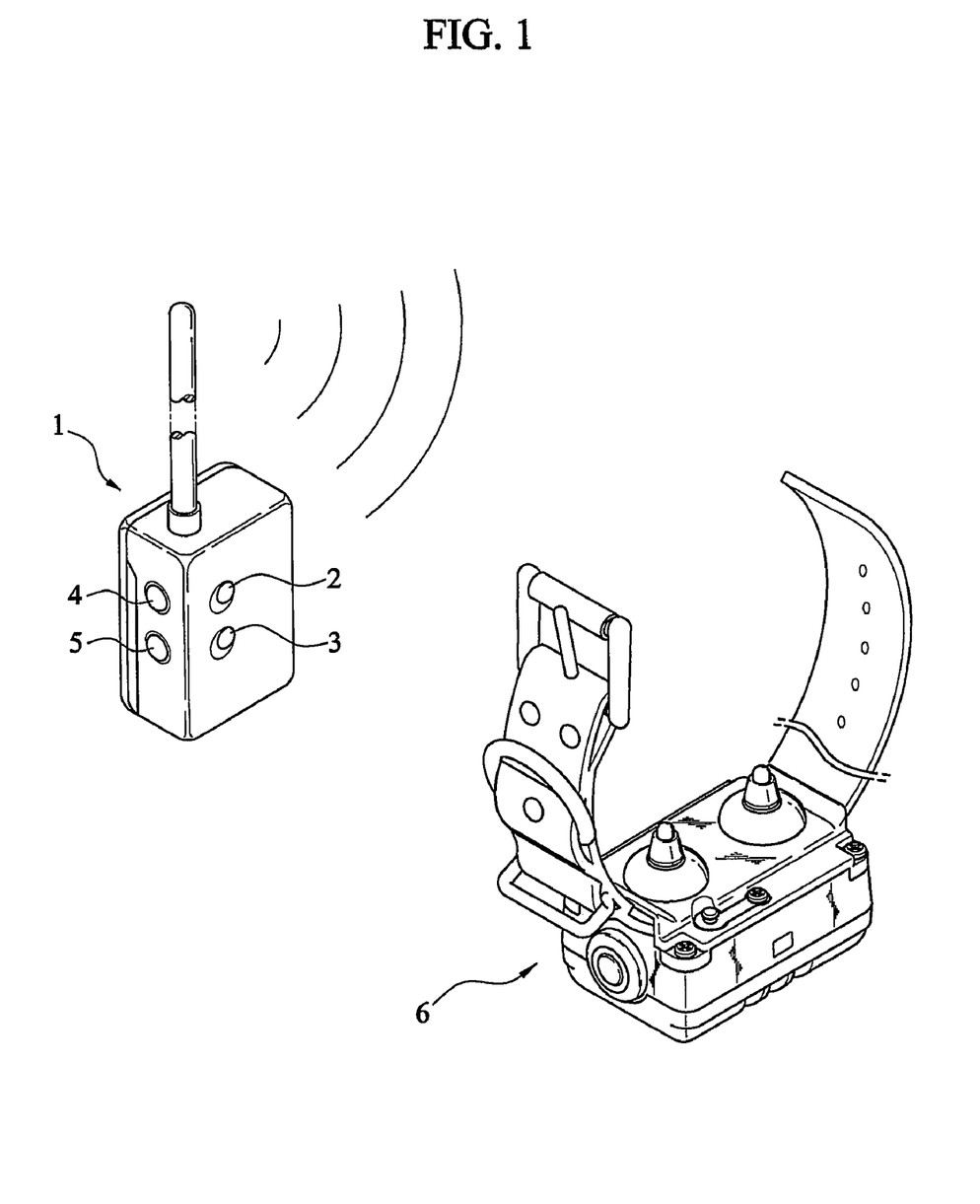
FIG. 1 shows the transmitter and receiver of an animal training device according to the prior art.

The transmitter 1 of an animal training device according to the prior art, as shown in FIG. 1, includes a first functional switch 2 for performing control such that shock waves to be applied to an animal are output for a predetermined period, a second functional switch 3 for performing control such that vibration is output, a third functional switch 4 for performing control such that a beep tone for calling an animal is output, and a fourth functional switch 5 for performing control such that shock waves are instantly output for a short period.

Further, a receiver 6 according to the prior art is worn around the neck of an animal, receives wireless frequency signals from the transmitter 1, and outputs any one of predetermined level shock wave, vibration, and beep tone for a predetermined period.

When a dog is trained or is employed for hunting using the animal training device according to the prior art, gloves are worn in order to keep the hands warm when it is cold or in order to protect them from being damaged by external objects.

When a manipulator wears gloves and presses any of the buttons of the animal training device so as to manipulate the animal training device, cloth or leather is present between the hand and the buttons. Therefore, the tactile sensation of the hand is hindered, so that it is difficult to check whether the button of the animal training device has been correctly pressed. The method of checking whether the button of the animal training device has been correctly pressed is to check whether the action of a dog complies with a command or to observe a display that displays the operation of the training device.

However, when animal is actually trained or employed for hunting, whether the action of a dog complies with a command should be observed while the button of the animal training device is pressed. Therefore, it is bothersome to check both an animal and the animal training device.

Japanese Unexamined Patent Publication No. 2001-117717 discloses the manipulation device of an electronic apparatus which employs a method of transmitting signals indicative of the details of the manipulation through a vibration actuator to the hands or ears of a manipulator using mechanical vibration or sounds.

The manipulation device of the electronic apparatus according to the prior art includes a vibration actuator for generating mechanical vibration and buzzing tones, a self-excitation oscillation circuit for vibrating the vibration actuator in a self-excitation manner, a buzzer-drive voltage doubler circuit for allowing the vibration actuator to generate buzzing tones, a click detection circuit for determining whether the button of the manipulation device is manipulated, and a coupling circuit for electrically insulating the manipulation device from the click detection circuit and passing only signals.

Although Japanese Unexamined Patent Publication 2001-117717 indicates whether a button has been manipulated using vibration or mechanical tones, the vibration or mechanical tones are not generated based on the type of button, such as a CONT button mounted on an animal training device (a button for applying a shock for the period during which the button has been pressed), a NICK button (a button for applying a shock for a short period, a PAGER button (a button for intermittently outputting vibration), or a beep tone button. Therefore, only the fact that a button has been manipulated can be determined, but whether a desired button is correctly manipulated cannot be known.

Meanwhile, the receiver is worn around the neck of a dog. When a plurality of dogs gather to play a game or to perform hunting, it is difficult to recognize the identification of the respective dogs, and thus the names of the respective dogs or telephone numbers of owners of the respective dogs are recorded on the collars of individual dogs. In order to overcome this inconvenience, it is necessary to provide a display to the receiver and display the identification of respective dogs.

SUMMARY OF THE INVENTION

Accordingly, the present invention has been made keeping in mind the above problems occurring in the prior art, and an object of the present invention is to provide a vibration touch button-type animal training device and a method of controlling the same, which generate vibration when a button switch has been pressed, so that a manipulator can determine whether the button switch of the animal training device has been manipulated.

Another object of the present invention is to provide a vibration touch button-type animal training device and a method of controlling the same, which vary the period for which vibration is generated depending on the type of button of the animal training device.

Still another object of the present invention is to provide a vibration touch button-type animal training device and a method of controlling the same, which enable whether a button has been manipulated to be known even though the button is manipulated when a manipulator wears gloves or when a transmitter has been placed in a pocket.

Still another object of the present invention is to provide a vibration touch button-type animal training device and a method of controlling the same, which display the identification data or training data of respective animals on a receiver, so that the identification or training status of the respective animals can be known.

In order to accomplish the above objects, the present invention provides a vibration touch button-type animal training device including a transmitter and a receiver, wherein: the transmitter includes a constant button switch for generating a signal in order to apply a shock for a preset long period; an intermittent button switch for generating a signal in order to apply a shock for a preset short period; a pager button switch for generating a signal in order to generate intermittent vibrations; a beep tone button switch for generating a beep tone; a transmission control unit for receiving signals from the respective button switches, performing control such that corresponding signals are transmitted, and performing control such that vibrations which are different from each other are generated based on the type of button switch; a wireless transmission unit for transmitting wireless signals corresponding to the signals input from the respective button switches in response to the control signal of the transmission control unit; a vibration generation unit for generating vibration in response to a control signal from the transmission control unit; and a shock level switch for determining the level of a shock to be applied to an animal; and the receiver includes a wireless reception unit for receiving signals from the transmitter; a Global Positioning System (GPS) reception unit for receiving positioning data from a GPS satellite and calculating a current position; an input port unit for receiving data related to user information and animal information from an input device; a reception control unit for receiving the positioning data from the GPS reception unit, performing control such that the distance of motion, the mileage, the average speed, and the amount of calorie consumption are calculated and then displayed, performing control such that the user information and the animal information are received from the data input device connected to the input port unit and then the received information are displayed, and performing control such that a shock level and a vibration/electric shock function, received from the wireless reception unit, are displayed; a display unit for displaying data under the control of the reception control unit; a shock generation unit for generating a shock under the control of the reception control unit; and a memory unit for storing the user information and the animal information received from the data input device connected to the input port unit.

Preferably, the long period, for which the set shock is applied using the constant button switch, is 12 seconds; and the short period, for which the set shock is applied using the intermittent button switch, is 0.5 seconds.

Preferably, the display unit of the receiver includes a display for displaying data; a menu button for displaying an animal identification data menu and an animal training data menu on the display; a selection button for selecting a menu, on which a cursor is located, from between the displayed menus; and an upward button and a downward button for moving the cursor across the menus displayed on the display.

Preferably, when power is applied, the display unit of the receiver displays the remaining capacity of a battery, the name of an animal, the telephone number of the owner of the animal, and a training data menu on the display.

In order to accomplish the above object, the present invention provides a method of controlling the transmitter of a vibration touch button-type animal training device, the method including performing initialization and determining whether one or more button switches has been pressed; determining whether any of a constant button switch, a pager button switch, and an intermittent button switch among the button switches has been pressed; if the intermittent button switch has been pressed, generating vibration in the body of a transmitter by driving a vibration generation unit for a preset short period; and if the constant button switch or the pager button switch has been pressed, generating vibration in the body of the transmitter by driving the vibration generation unit for a preset long period.

In order to accomplish the above object, the present invention provides a method of controlling the receiver of a vibration touch button-type animal training device, the method including performing initialization, and, if power is turned on, displaying the name of an animal, the telephone number of the owner of the animal, a shock level received from the receiver, and the remaining capacity of a battery on a display; detecting a selected function from a signal received from a transmitter, and displaying a shock function or a pager function; calculating a current time and calculating positioning data using a GPS reception unit, thereby calculating training data, such as the distance of motion of an animal and the amount of exercise of an animal; and determining whether the menu button of a display unit has been entered, determining whether an identification data display function or a training data display function has been selected, and displaying identification data or training data on the display.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Hereinafter, embodiments of the present invention will be described in detail with reference to the attached drawings.

Figure 2:
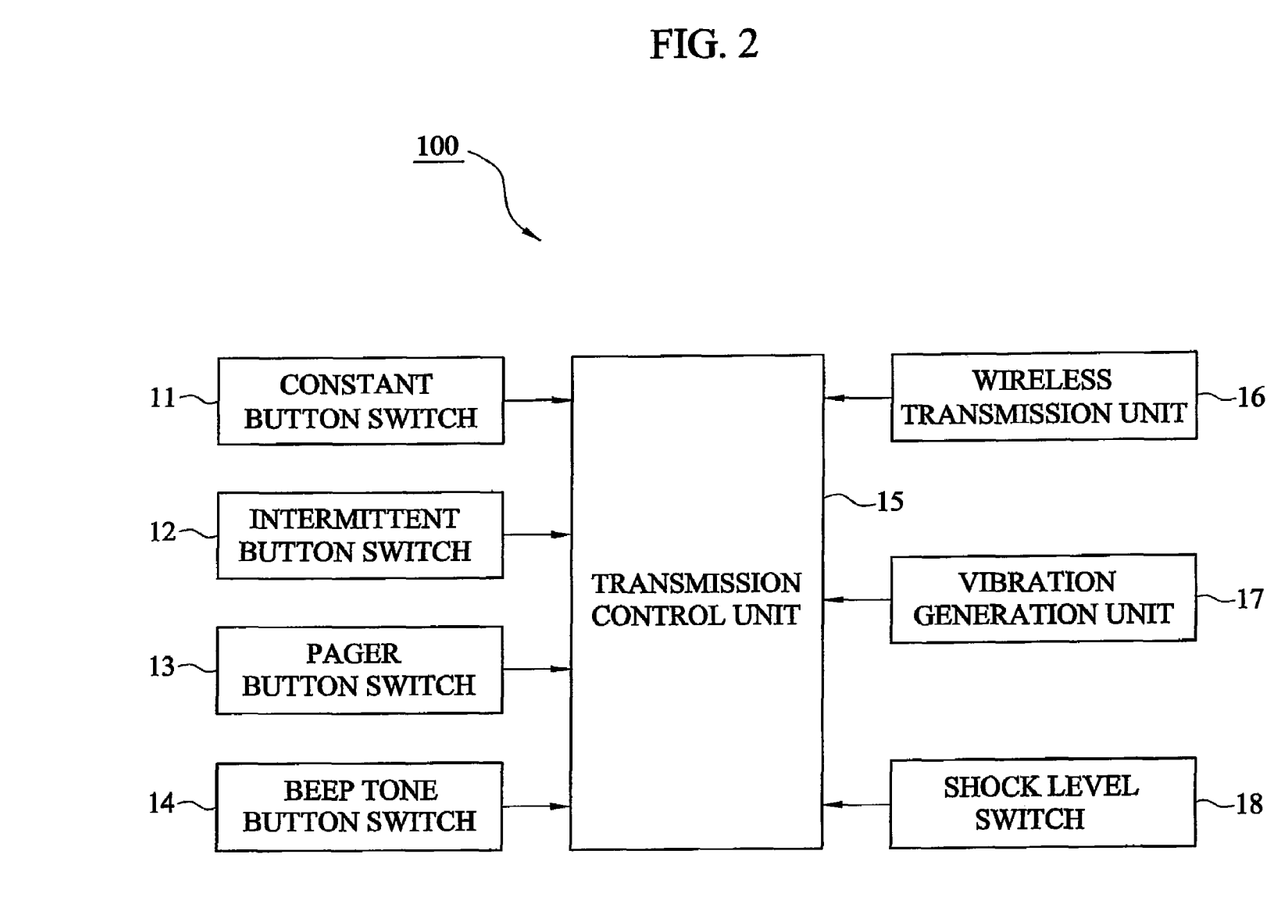
FIG. 2 is a block diagram showing the configuration of the transmitter of a vibration touch button-type animal training device according to the present invention.

FIG. 2 is a block diagram showing the configuration of the transmitter of a vibration touch button-type animal training device according to the present invention;

The transmitter 100 of the animal training device according to the present invention includes a constant button switch 11 for generating a signal in order to apply a shock for a preset long period (for example, 12 seconds), an intermittent button switch 12 for generating a signal in order to apply a shock for a preset short period (for example, 0.5 seconds), a pager button switch 13 for generating a signal in order to generate intermittent vibrations, a beep tone button switch 14 for generating a beep tone, a transmission control unit 15 for receiving signals from the above-described switches, performing control such that the corresponding signals are transmitted, and performing control such that vibrations which are different from each other are generated based on the respective button switches, a wireless transmission unit 16 for transmitting wireless signals corresponding to the signals input from the respective button switches in response to the control signal of the transmission control unit 15, a vibration generation unit 17 for generating vibration in response to a control signal transmitted from the transmission control unit 15, and a shock level switch 18 for determining the level of a shock to be applied to an animal.

Figure 3:
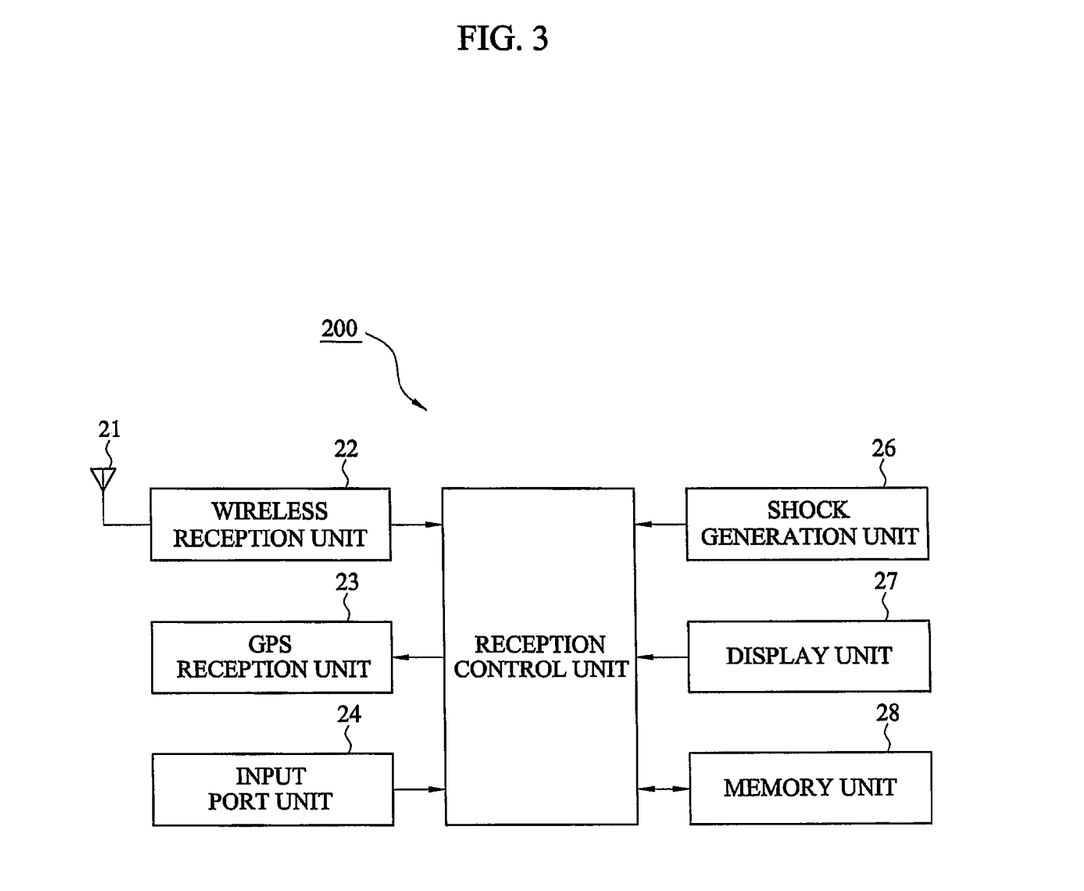
FIG. 3 is a block diagram showing the configuration of the receiver of the vibration touch button-type animal training device according to the present invention.

FIG. 3 is a block diagram showing the configuration of the receiver of the vibration touch button-type animal training device according to the present invention.

The receiver 200 includes a wireless reception unit 22 for receiving signals from the transmitter 100, a Global Positioning System (GPS) reception unit 23 for receiving positioning data from a GPS satellite and calculating a current position, an input port unit 24 for receiving data about a user and animals from an input device, a reception control unit 25 for receiving positioning data from the GPS reception unit 23, performing control such that the distance of motion, mileage, average speed, and calorie consumption are calculated and then displayed, performing control such that information about a user and dogs is received from the data input device connected to the input port unit 24, and then the received information is displayed, and performing control such that a shock level and a vibration/electric shock function, received from the wireless reception unit 22, are displayed, a display unit 27 for displaying data under the control of the reception control unit, a shock generation unit 26 for generating a shock under the control of the reception control unit 25, and a memory unit 28 for storing information about a user and animals received from the data input device connected to the input port unit 24.

Figure 4:
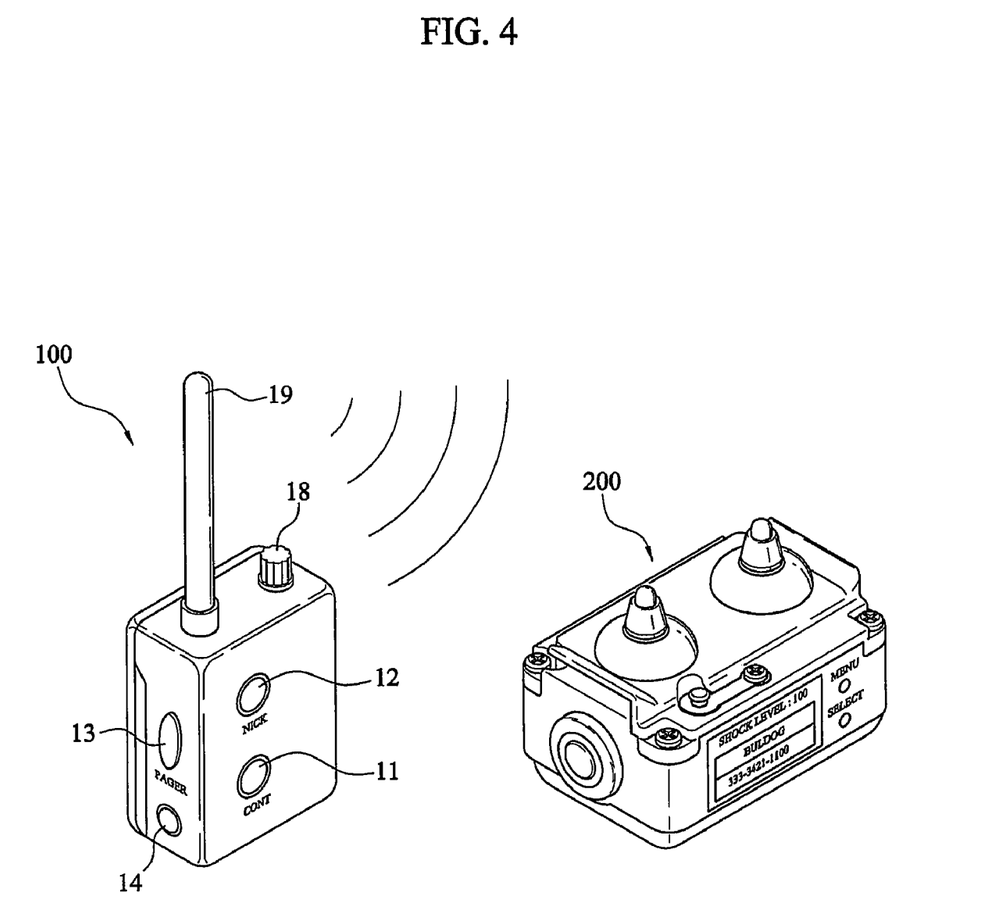
FIG. 4 is a perspective view showing the transmission/reception state between the transmitter and receiver of the vibration touch button-type animal training device according to the present invention.

FIG. 4 is a perspective view showing the transmission/reception state between the transmitter and receiver of the vibration touch button-type animal training device according to the present invention.

When a trainer, who trains an animal, manipulates the constant or intermittent button switch 11 or 12 to execute the corresponding function, the transmitter 100 of the animal training device transmits a signal to the receiver 200 such that an electric stimulation is constantly or intermittently applied to an animal.

Figure 5:
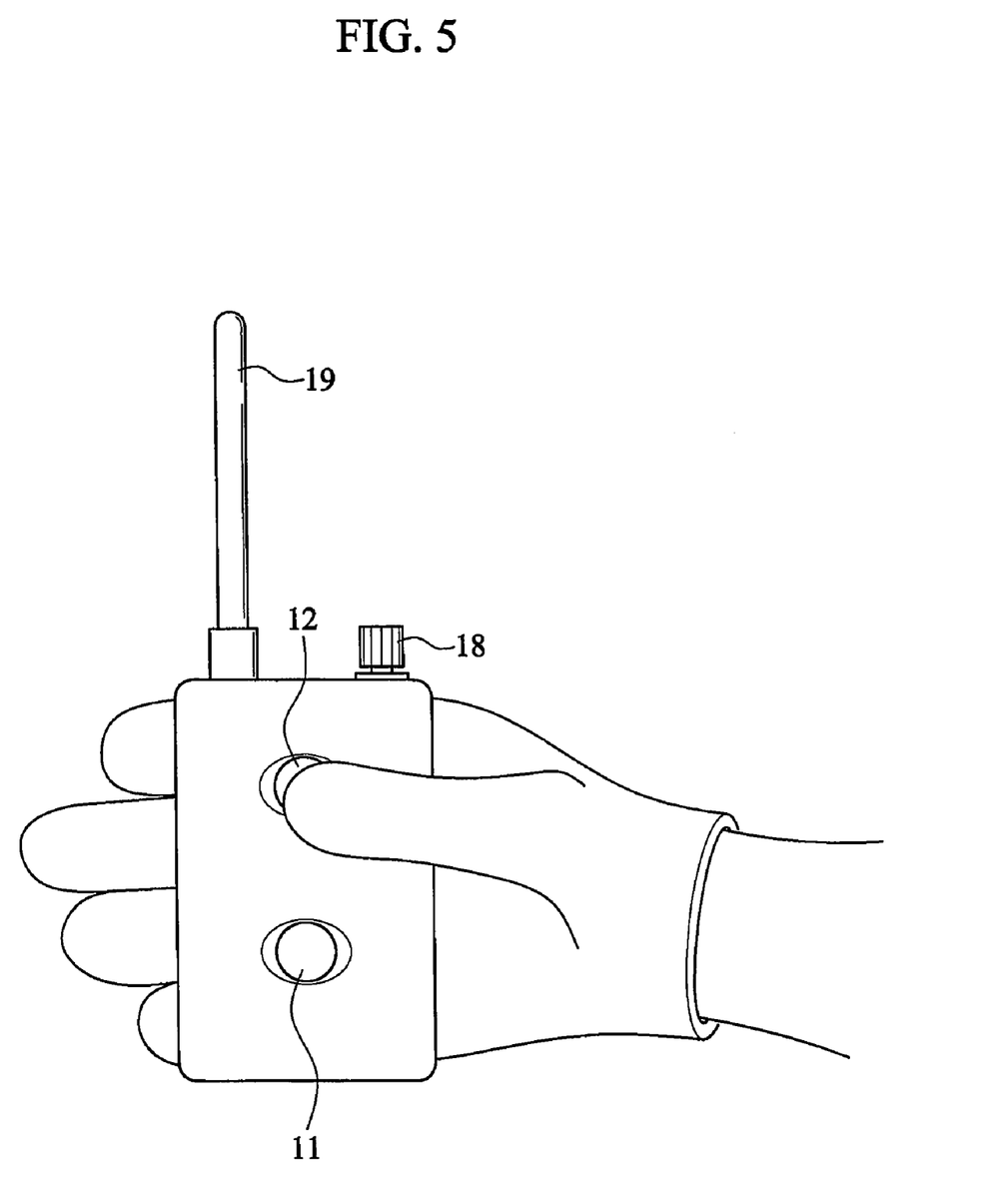
FIG. 5 is a view showing an example in which the transmitter according to the present invention is manipulated by a manipulator who wears gloves.

When the trainer trains an animal outdoors, the trainer may manipulate the button switches 11 to 14 of the transmitter 100 while wearing gloves, as shown in FIG. 5, or with the hands in his or her pockets in order to protect his or her hands from harmful outdoor objects.

However, the trainer should give instructions to a hunting dog while checking whether the actions of the trainee comply with the instructions or while checking the state of a hunted object. Therefore, when the trainer manipulates the button switches 11 to 14 in order to give instructions to a hunting dog while checking the action of the hunting dog or checking the state of a hunted object, the trainer manipulates the button switches 11 to 14 while wearing gloves or with the hands in his or her pockets. Therefore, when one of the button switches is pressed, it cannot be known whether the correct button switch has been pressed.

Here, the animal training device according to the present invention causes the vibration generation unit 17 installed in the transmitter 100 to generate vibration when the button switches 11 to 14 are manipulated, so that a trainer can know whether the respective buttons are manipulated even though the trainer manipulates the button switches 11 to 14 without observing them.

The vibration generation unit 17 may be formed using a motor having an eccentric axis or a piezoelectric element which vibrates when voltage is applied.

Figure 6:
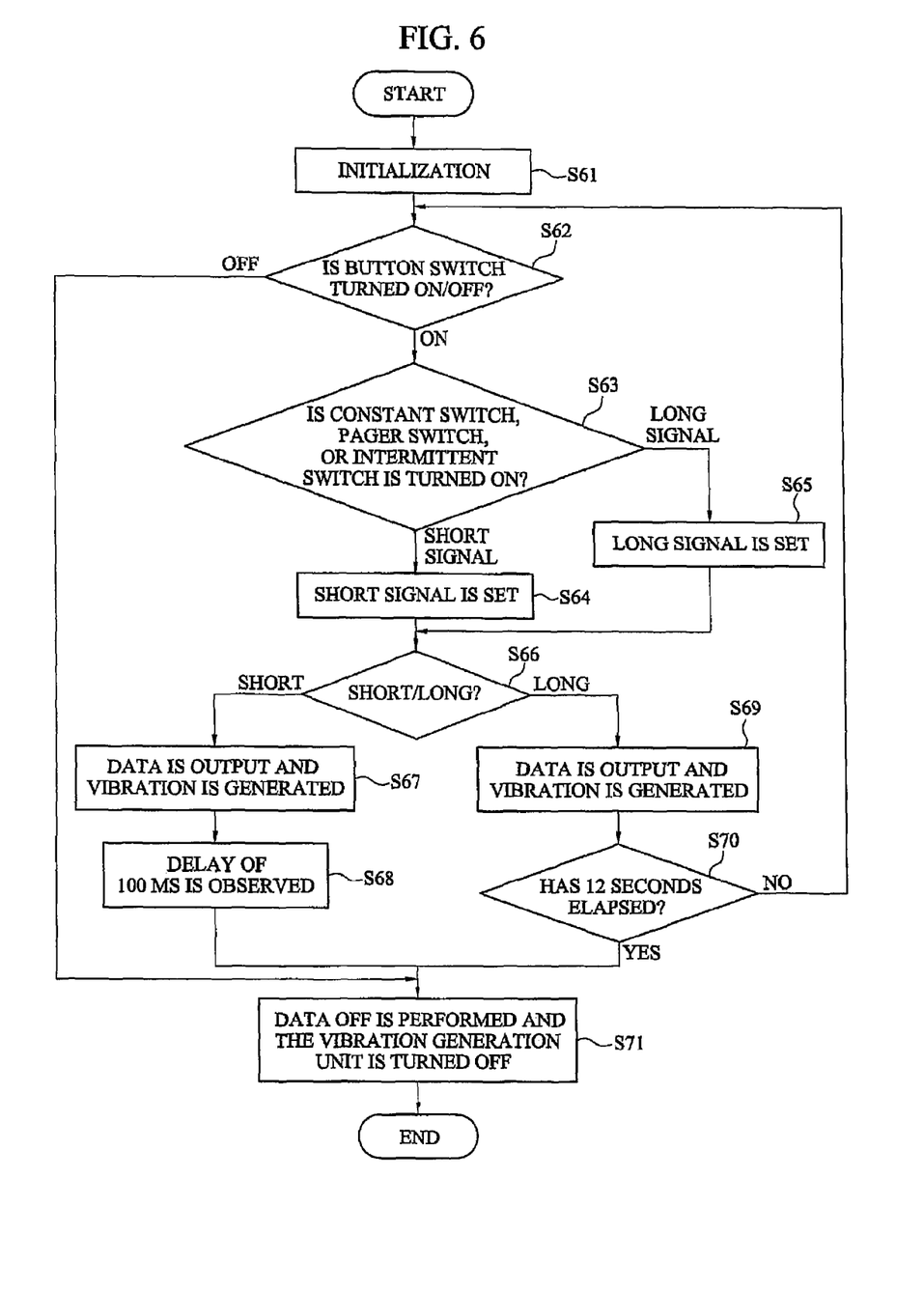
FIG. 6 is a flowchart showing a method of controlling the transmitter of the vibration touch button-type animal training device according to the present invention.

FIG. 6 is a flowchart showing a method of controlling the transmitter of the vibration touch button-type animal training device according to the present invention.

At step S61, initialization is performed. At step S62, whether any of the button switches 11 to 14 has been pressed is determined. If none of the button switches 11 to 14 has been pressed, the process proceeds to step S71, and data-off is performed and the vibration generation unit 17 is turned off. Thereafter, the present program is terminated. When one of the button switches 11 to 14 has been pressed, the process proceeds to step S63, and the pressed button switch among the constant button switch 11, the pager button switch 13, and the intermittent button switch 12, is determined.

If, as the results of the determination at step S63, the intermittent button switch 12 has been pressed, a relevant signal is set to a short signal at step S64. If the constant button switch 11 or the pager button switch 13 has been pressed, a relevant signal is set to a long signal at step S65. That is, if the constant button switch 11 or the pager button switch 13 has been pressed once, a shock or vibration is applied to an animal for a period ranging from the time at which the corresponding button has been pressed to 12 seconds. Here, even if the constant button switch 11 or the pager button switch 13 is pressed again, a shock or vibration is applied to an animal only for 12 seconds.

At step S66, whether a shock signal and a paging signal are set to short signals or long signals is determined. In the case where they are set to short signals, the process proceeds to step S67. Here, data used to apply a shock to an animal for a period corresponding to the short signal is output, and the vibration generation unit 17 is driven, so that vibrations are generated in the body of the transmitter 100. Thereafter, at step S68, a delay of 100 ms is observed, and then the process is proceeds to step S71. Here, data-off for the function of the receiver is performed and the vibration generation unit is turned off. Thereafter, the present program is terminated.

When the constant button switch or the pager button switch has been pressed and a relevant signal is set to a long signal, the process proceeds to step S69. Here, data used to apply a shock to an animal is output, and the vibration generation unit is driven for 12 seconds, so that vibrations are generated in the body of the transmitter 100. Thereafter, at step S70, whether 12 seconds has elapsed is determined.

If 12 seconds has not elapsed, the process returns to step S62 and subsequent processes are repeated. Here, a signal used to apply a shock for 12 seconds is output, and the vibration generation unit 17 is driven for 12 seconds, so that vibrations are generated. After 12 seconds has elapsed, the process proceeds to step S71. Here, data-off for a function of applying a shock to an animal is performed on the receiver, and the vibration generation unit 17 is turned off. Thereafter, the present program is terminated.

The receiver according to the present invention includes the display unit 27 having a display (for example, a Liquid Crystal Display (LCD), a Light-Emitting Diode (LED), or a Seven Segment Display) for displaying identification data about the animal being trained (date of birth, birthplace, pedigree of parents, and name/address of the owner), and a GPS reception unit 23 for calculating and displaying the training data and exercise data of an animal (the type of training, the time of exercise, the distance of exercise, the average speed, the amount of calorie consumption, and the number of walking steps taken during an exercise period) during the training.

Figure 7:
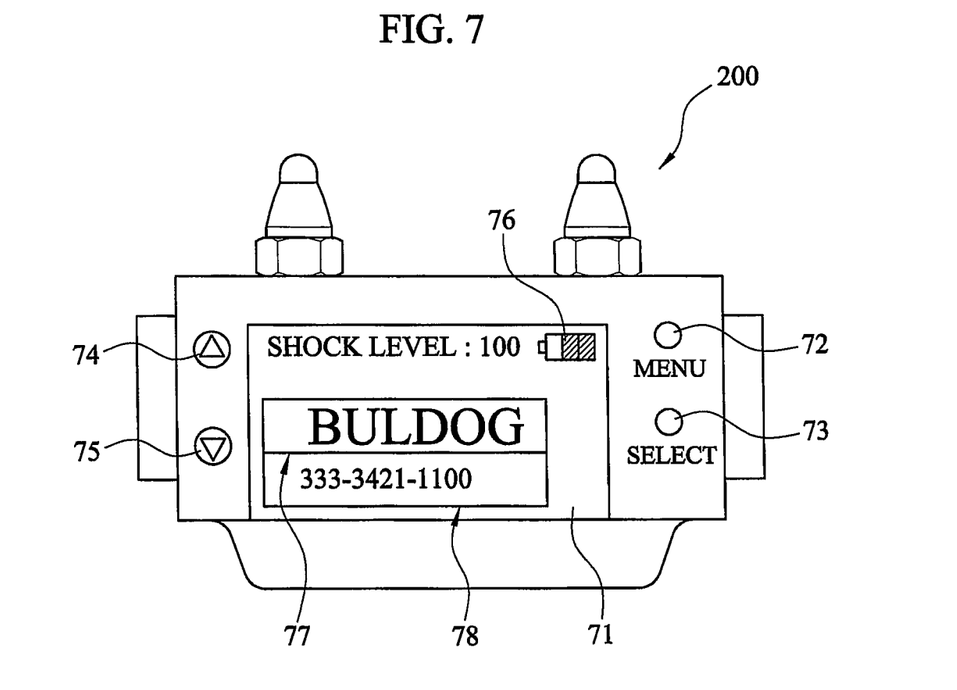
FIG. 7 is a view showing a display unit attached on the side of the receiver of the vibration touch button-type animal training device according to the present invention.

FIG. 7 is a view showing a display unit attached on the side of the receiver of the vibration touch button-type animal training device according to the present invention.

The display unit 27 of the receiver according to the present invention includes a display 71 for displaying data, a menu button 72 for displaying menu items on the display 71, a selection button 73 for selecting a menu item, on which a cursor is located, from among the displayed menu items, and an upward button 74 and a downward button 75 for moving the cursor across the menu items displayed on the display 71.

When a power button (not shown) has been pressed and power is supplied, the remaining capacity of a battery 76, the name of a dog 77, and the telephone number of the dog's owner 78, for example, "BULDOG, 333-3421-1100", are displayed on the display 71, so that the identification of the dog and the dog's owner can be confirmed. Here, the telephone number of the dog's owner can be displayed as well as the name of the dog's owner.

Figure 8:
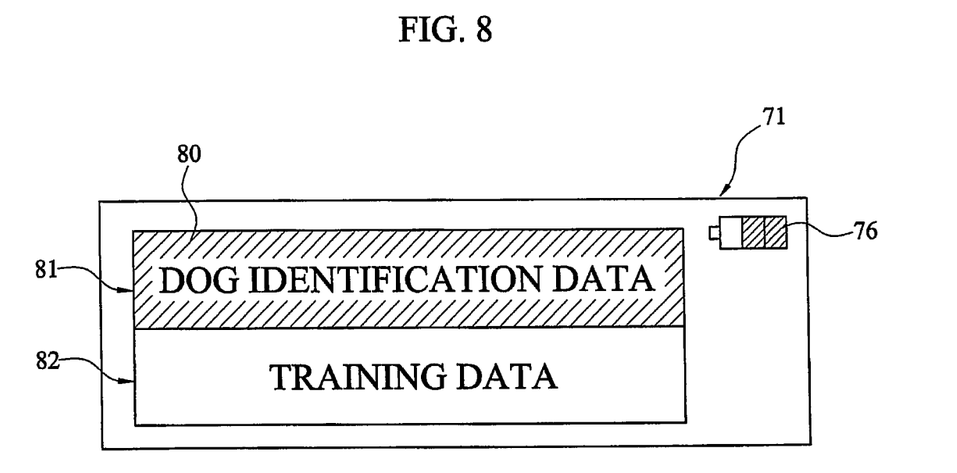
FIG. 8 is a view showing an example of a menu displayed on the display of the receiver of the vibration touch button-type animal training device according to the present invention.

When the menu button 72 is pressed in the state in which power is applied, the remaining capacity of a battery 76, a dog identification menu 81 and a dog training data menu 82 are displayed on the display 71, as shown in FIG. 8. When a cursor 80 is positioned on the dog identification menu 81, the dog identification menu 81 is shaded so that it is darker than the peripheral menus, thus indicating the fact that the cursor 80 is positioned on the dog identification menu 81.

Therefore, when a user wants to select the training data menu 82 and the downward button 75 is pressed, the cursor 80 moves to the training data menu 82 and is positioned on the training data menu 82. Thereafter, the training data menu 82 is shaded so that it is darker than the other peripheral menus, so that the fact that the cursor 80 is positioned on the training data menu 82 is indicated. Here, if the user presses the selection button 73, the training data is displayed on the display 71.

Figure 9A:
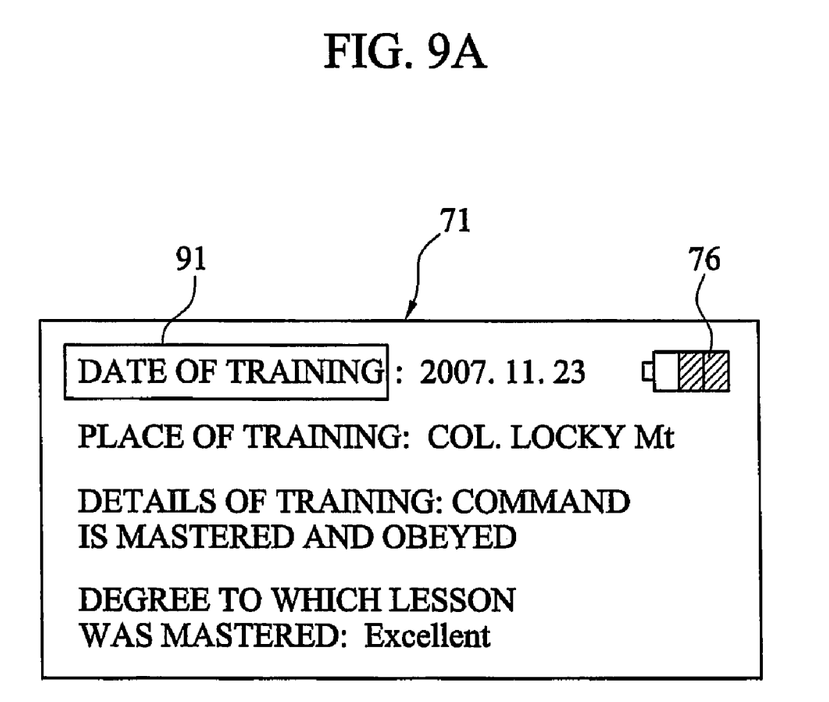
FIGS. 9A and 9B are views showing examples in which the training data is displayed on the display of the vibration touch button-type animal training device according to the present invention.
Figure 9B:
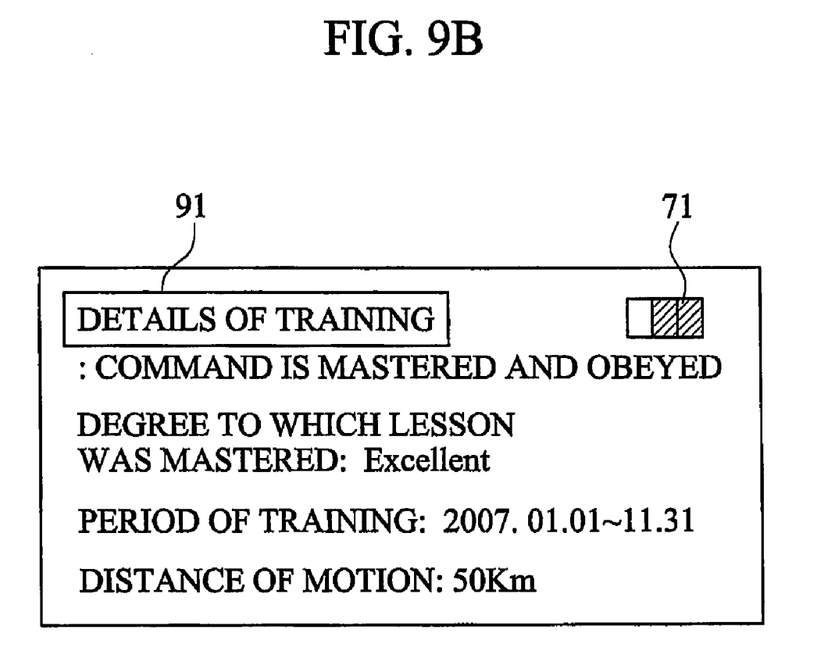

FIGS. 9A and 9B are views showing examples in which the training data is displayed on the display of the vibration touch button-type animal training device according to the present invention.

The training data, including the date of training, the place of training, the details of training, the degree to which a lesson was mastered, the period of training, the distance of motion, the average speed, the amount of calorie consumption, and the number of walking steps, is displayed, so that the degree to which a lesson was mastered and the improvement of an animal can be monitored.

The training data has a large number of items, and thus the training data is difficult to be displayed on the display 71 at the same time. Therefore, four items are displayed at the same time, and the remaining items of the training data are displayed by moving a cursor up and down on the items using the upward button 74 or the downward button 75.

That is, when the downward button 75 is pressed, a cursor 91 moves from a "date of training" item to a "place of training" item. Further, when the downward button 75 is pressed again, the cursor 91 moves from the "place of training" item to a "details of training" item. In such a way, if the downward button 75 is pressed in the state in which the cursor 91 is positioned on a "degree to which a lesson was mastered" item, the displayed "date of training" item disappears and a "period of training" item, which was not displayed, appears on the lowermost portion of the display 71.

In the same manner, as shown in FIG. 9B, when the upward button 74 is pressed, the cursor 91 goes up by one item and reaches an uppermost item, that is, a "details of training" item. Here, if the upward button 74 is pressed again, the lowermost item, that is, a "distance of motion" item, is not displayed. That is, a "place of training" item, which was located above the uppermost item, is displayed on the uppermost portion, and the "details of training" item comes down one step and is displayed on a second row.

Figure 10:
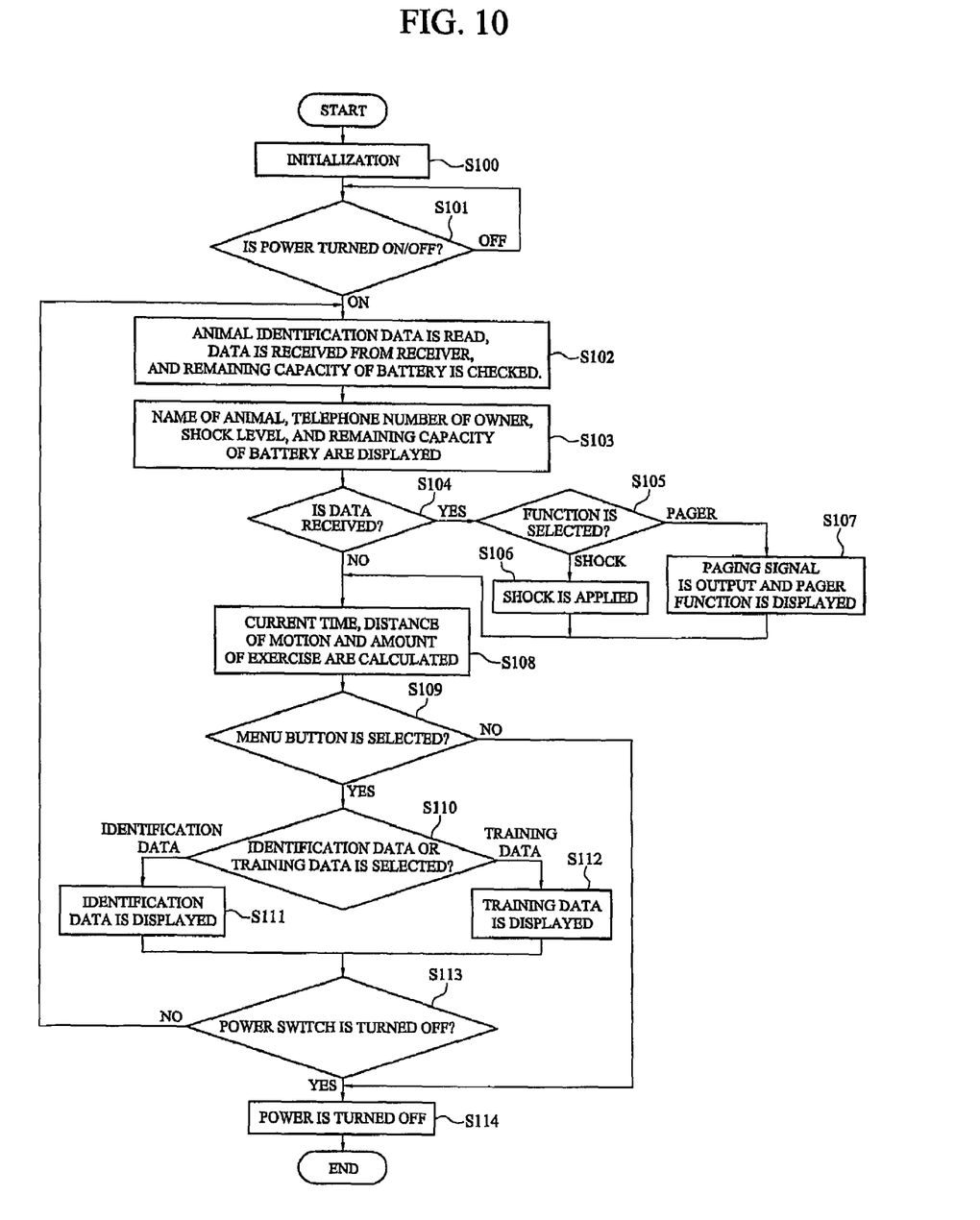
FIG. 10 is a flowchart showing a method of displaying the identification data and training data of an animal on the display unit of the receiver of the vibration touch button-type animal training device according to the present invention.

FIG. 10 is a flowchart showing a method of displaying the identification data and training data of an animal on the display unit of the receiver of the vibration touch button-type animal training device according to the present invention.

At step S100, initialization is performed. At step S101, whether power is turned on or turned off is determined. In the case that power is turned off, a waiting state continues until a power-on signal is input. At step S102, if power is turned on, animal identification data is read from the memory unit 28, shock level data is detected from a signal received from the receiver, and the remaining capacity of a battery is checked.

At step S103, the name of an animal and the telephone number of the owner of the animal are read from the animal identification data and are displayed on the display 71, the shock level data is detected from the signal received from the receiver and is displayed on the display 71, and the remaining capacity of a battery is checked and displayed on the display 71.

At step S104, whether a signal has been received from the transmitter 100 is checked. If a signal has been received, a selected function is detected (at step S105). In the case where a shock application function has been selected, a shock is applied to an animal based on a set level at step S106, and then the process proceeds to step S108. In the case where a pager function has been selected, a paging signal is output by driving a vibration motor, and the fact that the pager function has been selected is displayed on the display 71 at step S107, and then the process proceeds to step S108.

At step S108, current time is calculated, and positioning data is calculated using the GPS reception unit 23, so that training data, such as the distance of motion and the amount of exercise for an animal, is calculated. At step S109, whether the menu button 72 of the display unit 27 has been pressed is determined.

In the case that the menu button 72 has not been pressed, the process proceeds to step S114. That is, power is turned off and the present program is terminated. In the case that the menu button 72 has been pressed, whether any of the identification data menu for a dog and the training data menu for a dog is selected is determined. In the case that an identification data display menu is selected, the identification data of a dog is displayed at step S111. In the case that the training data display menu is selected, the training data is displayed on the display 71 at step S112, and then the process proceeds to step S113.

At step S113, the state of a power switch is checked. If the power switch is not turned off, the process returns to step S102 and processes thereafter are repeated. If the power switch is turned off, the power is turned off at step S114 and the present program is terminated.

As described above, the receiver of the animal training device according to the present invention includes the display 71, so that remaining battery capacity data, animal identification data, and animal training data are displayed, with the result that the period for which it is possible to run on a battery can be estimated. Further, when a large number of dogs is trained or is employed for hunting, the animal identification data can be rapidly detected using the name of a dog and the telephone number of the owner of the dog displayed on the display 71 without the bother of attaching additional name tags.

According to the present invention, when a button switch is manipulated, vibrations are generated in the body of the transmitter, so that whether a button switch is manipulated can be sensed even in the state in which the button switch is manipulated while a manipulator wears gloves or has his/her hands in his/her pockets. Further, the remaining battery capacity data, the animal identification data, and animal training data are displayed on the receiver, so that the period for which it is possible to run on a battery can be estimated and the bother of attaching additional name tags can be avoided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vibration touch button-type animal training device comprising a transmitter and a receiver, wherein:
   the transmitter comprises:
   a constant button switch for generating a signal in order to apply a shock for a preset long period;
   an intermittent button switch for generating a signal in order to apply a shock for a preset short period;
   a pager button switch for generating a signal in order to generate intermittent vibrations;
   a beep tone button switch for generating a beep tone;
   a transmission control unit for receiving signals from the respective button switches, performing control such that corresponding signals are transmitted, and performing control such that vibrations which are different from each other are generated based on a type of button switch;
   a wireless transmission unit for transmitting wireless signals corresponding to the signals input from the respective button switches in response to a control signal of the transmission control unit;
   a vibration generation unit for generating vibration in response to a control signal from the transmission control unit; and
   a shock level switch for determining a level of a shock to be applied to an animal; and
   the receiver comprises:
   a wireless reception unit for receiving signals from the transmitter;
   a Global Positioning System (GPS) reception unit for receiving positioning data from a GPS satellite and calculating a current position;
   an input port unit for receiving data related to user information and animal information from an input device;
   a reception control unit for receiving the positioning data from the GPS reception unit, performing control such that a distance of motion, a mileage, an average speed, and an amount of calorie consumption are calculated and then displayed, performing control such that the user information and the animal information are received from the data input device connected to the input port unit and then the received information are displayed, and performing control such that a shock level and a vibration/electric shock function, received from the wireless reception unit, are displayed;
   a display unit for displaying data under a control of the reception control unit;
   a shock generation unit for generating a shock under a control of the reception control unit; and
   a memory unit for storing the user information and the animal information received from the data input device connected to the input port unit.

2. The vibration touch button-type animal training device as set forth in claim 1, wherein:
   the long period, for which the set shock is applied using the constant button switch, is 12 seconds; and
   the short period, for which the set shock is applied using the intermittent button switch, is 0.5 seconds.

3. The vibration touch button-type animal training device as set forth in claim 1, wherein the display unit of the receiver comprises:
   a display for displaying data;
   a menu button for displaying an animal identification data menu and an animal training data menu on the display;
   a selection button for selecting a menu, on which a cursor is located, from between the displayed menus; and
   an upward button and a downward button for moving the cursor across the menus displayed on the display.

4. The vibration touch button-type animal training device as set forth in claim 3, wherein, when power is applied, the display unit of the receiver displays remaining capacity of a battery, a name of an animal, a telephone number of an owner of the animal, and a training data menu on the display.

5. A method of controlling a transmitter of a vibration touch button-type animal training device, the method comprising:
   providing said device as claimed in claim 1 performing initialization and determining whether one or more button switches has been pressed;
   determining whether any of said constant button switch, said pager button switch, and said intermittent button switch among the button switches has been pressed;
   if the intermittent button switch has been pressed, generating vibration in a body of said transmitter by driving said vibration generation unit for a preset short period; and
   if the constant button switch or the pager button switch has been pressed, generating vibration in the body of the transmitter by driving the vibration generation unit for a preset long period.

6. A method of controlling a receiver of a vibration touch button-type animal training device, the method comprising:
   providing the device as claimed in claim 1 performing initialization, and, if power is turned on, displaying a name of an animal, a telephone number of an owner of the animal, a shock level received from a receiver, and remaining capacity of a battery on a display;
   detecting a selected function from a signal received from said transmitter, and displaying a shock function or a pager function;
   calculating a current time and calculating positioning data using said GPS reception unit, thereby calculating training data; and
   determining whether a menu button of said display unit has been entered, determining whether an identification data display function or a training data display function has been selected, and displaying identification data or training data on the display.

* * * * *